US010698330B2

(12) United States Patent
Kitahara et al.

(10) Patent No.: US 10,698,330 B2
(45) Date of Patent: Jun. 30, 2020

(54) CARRIER CORE MATERIAL AND ELECTROPHOTOGRAPHIC DEVELOPMENT CARRIER USING SAME AND ELECTROPHOTOGRAPHIC DEVELOPER

(71) Applicants: DOWA ELECTRONICS MATERIALS CO., LTD., Tokyo (JP); DOWA IP CREATION CO., LTD., Okayama-shi, Okayama (JP)

(72) Inventors: Yuki Kitahara, Okayama (JP); Shou Ogawa, Okayama (JP)

(73) Assignees: DOWA ELECTRONICS MATERIALS CO., LTD., Tokyo (JP); DOWA IP CREATION CO., LTD., Okayama (JP)

( * ) Notice: Subject to any disclaimer, the term of this patent is extended or adjusted under 35 U.S.C. 154(b) by 0 days.

(21) Appl. No.: 16/080,062

(22) PCT Filed: Mar. 28, 2017

(86) PCT No.: PCT/JP2017/012582
§ 371 (c)(1),
(2) Date: Aug. 27, 2018

(87) PCT Pub. No.: WO2017/170512
PCT Pub. Date: Oct. 5, 2017

(65) Prior Publication Data
US 2019/0064688 A1 Feb. 28, 2019

(30) Foreign Application Priority Data
Mar. 31, 2016 (JP) ................................. 2016-071103

(51) Int. Cl.
*G03G 9/10* (2006.01)
*G03G 9/107* (2006.01)
(Continued)

(52) U.S. Cl.
CPC ....... *G03G 9/1075* (2013.01); *C01G 49/0018* (2013.01); *G03G 9/107* (2013.01);
(Continued)

(58) Field of Classification Search
CPC .... G03G 9/1075; G03G 9/1131; G03G 13/06; C01G 49/0018
(Continued)

(56) References Cited

U.S. PATENT DOCUMENTS

2014/0242511 A1* 8/2014 Kawauchi ........... C04B 35/2633
430/111.33

FOREIGN PATENT DOCUMENTS

| JP | 2014-197133 A | 10/2014 |
| JP | 2014-197134 A | 10/2014 |
| JP | 2015-101509 A | 6/2015 |

OTHER PUBLICATIONS

Jun. 27, 2017 International Search Report issued in International Patent Application No. PCT/JP2017/012582.

* cited by examiner

*Primary Examiner* — Mark A Chapman
(74) *Attorney, Agent, or Firm* — Oliff PLC

(57) ABSTRACT

A carrier core material formed with ferrite particles, the skewness Rsk of the particle is equal to or more than −0.40 but equal to or less than −0.20, and the kurtosis Rku of the particle is equal to or more than 3.20 but equal to or less than 3.50. Here, the maximum height Rz of the particle is equal to or more than 2.20 μm but equal to or less than 3.50 μm. Moreover, the ferrite particle contains at least either of Mn and Mg elements. In this way, cracking or chipping in a concave-convex portion of a particle surface is unlikely to
(Continued)

occur, and moreover, the amount of coating resin used can be reduced without properties such as electrical resistance being lowered.

4 Claims, 2 Drawing Sheets

(51) Int. Cl.
    *G03G 9/113*     (2006.01)
    *C01G 49/00*     (2006.01)
    *G03G 13/06*     (2006.01)

(52) U.S. Cl.
    CPC ......... *G03G 9/1131* (2013.01); *G03G 9/1136* (2013.01); *G03G 13/06* (2013.01)

(58) Field of Classification Search
    USPC ..................................................... 430/111.33
    See application file for complete search history.

CARRIER CORE MATERIAL AND ELECTROPHOTOGRAPHIC DEVELOPMENT CARRIER USING SAME AND ELECTROPHOTOGRAPHIC DEVELOPER

TECHNICAL FIELD

The present invention relates to a carrier core material and an electrophotographic development carrier using such a carrier core material and an electrophotographic developer.

BACKGROUND ART

For example, in an image forming apparatus using an electrophotographic system, such as a facsimile, a printer or a copying machine, a toner is adhered to an electrostatic latent image formed on the surface of a photosensitive member to visualize it, the visualized image is transferred to a sheet or the like and thereafter it is fixed by being heated and pressurized. In terms of achieving high image quality and colorization, as a developer, a so-called two-component developer containing a carrier and a toner is widely used.

In a development system using a two-component developer, a carrier and a toner are agitated and mixed within a development device, and the toner is charged by friction so as to have a predetermined amount. Then, the developer is supplied to a rotating development roller, a magnetic brush is formed on the development roller and the toner is electrically moved to a photosensitive member through the magnetic brush to visualize an electrostatic latent image on the photosensitive member. The carrier after the movement of the toner is separated from the top of the development roller, and is mixed again with the toner within the development device. Hence, as the properties of the carrier, a magnetic property for forming the magnetic brush, a charging property for providing desired charge to the toner and durability in repeated use are required.

Hence, a carrier which is obtained by coating, with a resin, the surface of magnetic particles such as magnetite or various types of ferrites is generally used. In the magnetic particles serving as a carrier core material, not only a satisfactory magnetic property but also a satisfactory friction charging property for the toner is required. As the carrier core material which satisfies the properties described above, carrier core materials having various shapes are proposed.

The present applicant also focuses on a grain which forms a concave-convex shape of the surface of a carrier core material, that is, a difference between the peak part and the trough part of a so-called crystal grain and the shape of the corner of the grain, and proposes that the maximum height Rz which serves as an index for a difference between the peak part and the trough part of the grain and a skewness Rsk which serves as an index for the degree of deviation of a region of the peak part and a region of the trough part in the concave-convex portion of the particle surface be made to fall within specific ranges (patent document 1).

RELATED ART DOCUMENT

Patent Document

Patent Document 1: Japanese Unexamined Patent Application Publication No. 2015-101509

DISCLOSURE OF THE INVENTION

Problems to be Solved by the Invention

Incidentally, in recent years, an image formation speed has been increasingly raised, and thus the agitation speed and the transport speed of a developer within a development device have been increased. When a carrier core material having a concave-convex shape is used in such a high-speed image forming apparatus, there is a concern for the occurrence of the cracking or chipping of the carrier core material. It is hoped that the amount of coating resin used is reduced without the properties of a carrier such as electrical resistance being lowered.

Hence, an object of the present invention is to provide a carrier core material in which cracking or chipping is unlikely to occur and in which moreover, the amount of coating resin used can be reduced without properties such as electrical resistance being lowered.

Another object of the present invention is to provide an electrophotographic development carrier and an electrophotographic developer which can stably form satisfactory quality images even in long-term use.

Means for Solving the Problem

According to the present invention, there is provided a carrier core material which is formed with ferrite particles, where the skewness Rsk of the particle is equal to or more than −0.40 but equal to or less than −0.20, and the kurtosis Rku of the particle is equal to or more than 3.20 but equal to or less than 3.50. The skewness Rsk and the kurtosis Rku of the particle are values which were measured with a measurement method described in examples. In the present specification, unless otherwise particularly specified, "to" is used to mean that values mentioned before and after the "to" are included as the lower limit value and the upper limit value.

Here, the maximum height Rz of the particle is preferably equal to or more than 2.20 μm but equal to or less than 3.50 μm.

Moreover, the ferrite particle preferably contains at least either of Mn and Mg elements.

Moreover, according to the present invention, there is also provided an electrophotographic development carrier, where the surface of the carrier core material described above is coated with a resin.

Furthermore, according to the present invention, there is also provided an electrophotographic developer including: the electrophotographic development carrier described above; and a toner.

Advantages of the Invention

In the carrier core material according to the present invention, a concave-convex shape formed in the surface thereof is a specific shape, and thus cracking or chipping is unlikely to occur, with the result that even when an image formation speed is increased, it is possible to maintain high image quality even in long-term use. It is also possible to reduce the amount of coating resin used without properties such as electrical resistance being lowered.

In the electrophotographic development carrier and the electrophotographic developer according to the present invention, it is possible to increase the speed of image formation and enhance the image quality.

DESCRIPTION OF EMBODIMENTS

Figure 1:
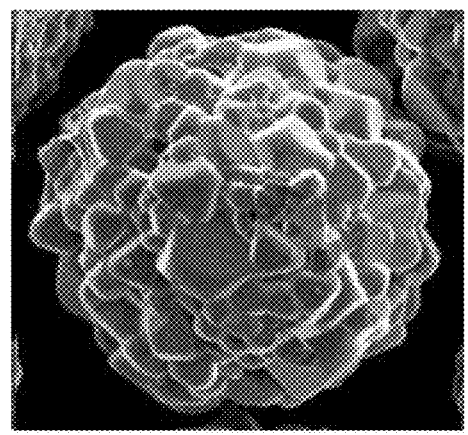
FIG. 1 An SEM photograph of a carrier core material in example 5.

The present inventors have conducted a thorough study for reducing, in a carrier core material formed with ferrite particles having a concave-convex shape, the cracking or chipping of the particles while maintaining properties obtained by the concave-convex shape and further reducing the amount of coating resin, and consequently have found that a skewness Rsk which serves as an index for the degree of deviation of a region of a peak part and a region of a trough part in the concave-convex portion of the particle surface and a kurtosis Rku which serves as an index for the degree of sharpness of the concave-convex portion of the particle surface are preferably made to fall within predetermined ranges.

Specifically, it is a major feature of the carrier core material according to the present invention that the skewness Rsk of the particle is equal to or more than −0.40 but equal to or less than −0.20, and that the kurtosis Rku of the particle is equal to or more than 3.20 but equal to or less than 3.50. The skewness Rsk and the kurtosis Rku are made to fall within these ranges, and thus the cracking or chipping of the concave-convex portion can be reduced, and a predetermined area of the particle surface can be coated with a smaller amount of coating resin used than a conventional amount. Moreover, as with conventional concave-convex particles, charge which is charged by frictional charging leaks from an exposed part so as not to be accumulated, and since the predetermined area of the particle surface is coated with the resin, a predetermined electrical resistance is retained.

The composition of the ferrite particles in the present invention is not particularly limited, and for example, particles of a composition represented by a general formula $M_xFe_{3-x}O_4$ (where M is at least one type of metal element selected from divalent metal elements such as Mg, Mn, Ca, Ti, Cu, Zn, Sr and Ni, $0<X<1$) can be mentioned. Among them, particles which contain Sr and in which the main composition is a Mn ferrite, a Mg ferrite or a MnMg ferrite are preferably used.

Although the particle diameter of the carrier core material of the present invention is not particularly limited, the volume average particle diameter thereof is preferably made to fall within a range of 20 to 50 μm, and the particle size distribution thereof is preferably sharp.

Although a method of manufacturing the carrier core material of the present invention is not particularly limited, a manufacturing method which will be described below is preferable.

First, a Fe component raw material, a M component raw material and as necessary, an additive are weighed, are put into a dispersion medium and are mixed, and thus slurry is produced. M is at least one type of metal element selected from divalent metal elements such as Mg, Mn, Ca, Ti, Cu, Zn, Sr and Ni. As the Fe component raw material, $Fe_2O_3$ or the like is preferably used. As the M component raw material, for Mn, $MnCO_3$, $Mn_3CO_4$ or the like can be used, and for Mg, MgO, $Mg(OH)_2$ or $MgCO_3$ is preferably used. As the Ca component raw material, CaO, $Ca(OH)_2$, $CaCO_3$ or the like is preferably used.

Here, in order for the surface of the carrier core material to have the concave-convex shape, a small amount of Sr is preferably added. A small amount of Sr is added to partially generate a Sr ferrite in a calcination process and thus a magnetoplumbite-type crystal structure is formed, with the result that the concave-convex shape of the surface of the carrier core material is more likely to be facilitated. As a Sr component raw material, $SrCO_3$, $Sr(NO_3)_2$ or the like is preferably used.

In order to make the concave-convex shape formed in the surface of the ferrite particles the shape specified in the present invention, in addition to Sr, a chlorine component is preferably added. In this way, the concave-convex shape specified in the present invention is easily formed. Although a mechanism in which the concave-convex shape specified in the present invention is easily formed by the addition of Sr and chlorine has not been sufficiently found, it is estimated that in a granulation step which will be described later, a compound of chlorine and Sr, for example, SrClOH is generated, that a granulated material containing this compound is calcined at a temperature higher than a conventional temperature in a calcination process which will be described later such that the compound affects the growth of ferrite crystal and that thus the desired concave-convex shape is easily formed. As a chlorine component raw material, HCL, $FeCl_3$ and the like can be mentioned. The amount of chlorine added is preferably equal to or more than 0.1 mol % but equal to or less than 0.5 mol % with respect to the elements forming the ferrite.

In general, $Fe_2O_3$ of an industrial product grade which is used as a Fe raw material contains, as an impurity, several tens of ppm to several hundreds of ppm of a chlorine component. $Fe_2O_3$ used in the present invention contains 300 ppm or less of a chlorine component. When a granulated material is produced without addition of a chlorine component, the chlorine component contained in the granulated material is equal to or less than 0.02 mol %.

As the dispersion medium used in the present invention, water is preferable. The Fe component raw material and the M component raw material and as necessary a binder, a dispersant and the like may be mixed into the dispersion medium. As the binder, for example, polyvinyl alcohol can be preferably used. As the amount of binder mixed, the concentration of the binder in the slurry is preferably set to about 0.5 to 2 mass %. As the dispersant, for example, polycarboxylic acid ammonium or the like can be preferably used. As the amount of dispersant mixed, the concentration of the dispersant in the slurry is preferably set to about 0.5 to 2 mass %. In addition, a lubricant, a sintering accelerator and the like may be mixed. The solid content concentration of the slurry preferably falls within a range of 50 to 90 mass %. Before the Fe component raw material and the M component raw material are put into the dispersion medium, as necessary, milling and mixing processing may be performed.

In a method of manufacturing a conventional carrier core material, mixed powder obtained by mixing component raw materials is also temporarily calcined. One of the purposes for performing temporary calcination is to evaporate and remove a chlorine component contained in a Fe component raw material and the like. In the method of manufacturing the carrier core material of the present invention, as described previously, since the chlorine component is preferably present in the main calcination, the main calcination is preferably performed without intervention of temporary calcination.

Then, the slurry produced as described above is wet-milled. For example, a ball mill or a vibration mill is used to perform wet-milling for a predetermined time. The average particle diameter of the milled raw materials is preferably equal to or less than 5 μm and is more preferably equal to or less than 1 μm. Within the vibration mill or the ball mill, a medium having a predetermined particle diameter is preferably present. Examples of the material of the medium include an iron-based chromium steel and oxide-based zirconia, titania and alumina. As the form of the milling step, either of a continuous type and a batch type may be used. The particle diameter of the milled material is adjusted such as by a milling time, a rotation speed and the material and the particle diameter of the medium used.

Then, the milled slurry is granulated by being sprayed and dried. Specifically, the slurry is introduced into a spray drying machine such as a spray dryer, is sprayed into an atmosphere and is thereby granulated into a spherical shape. The temperature of the atmosphere at the time of the spray drying preferably falls within a range of 100 to 300° C. In this way, it is possible to obtain a spherical granulated material having a particle diameter of 10 to 200 μm. Preferably, for the obtained granulated material, a vibrating screen or the like is used, and thus coarse particles and fine powder are removed such that the particle size distribution becomes sharp.

Then, the granulated material is put into a furnace heated to a predetermined temperature, and is calcined by a general method for synthesizing ferrite particles, and thus ferrite particles are generated. Here, the calcination temperature preferably falls within a range of 1140 to 1230° C. which is higher than a conventional calcination temperature. The rate of temperature increase to the calcination temperature preferably falls within a range of 250 to 500° C./h. The concentration of oxygen in the calcination atmosphere preferably falls within a range of 100 to 30000 ppm.

The calcined material obtained as described above is disintegrated as necessary. Specifically, for example, a hammer mill or the like is used to disintegrate the calcined material. As the form of the disintegration step, either of a continuous type and a batch type may be used. Then, as necessary, classification may be performed such that the particle diameters are made to fall within a predetermined range. As a classification method, a conventional known method such as air classification or sieve classification can be used. After primary classification is performed with an air classifier, with a vibration sieve or an ultrasonic sieve, the particle diameters may be made to fall within the predetermined range. Furthermore, after the classification step, non-magnetic particles may be removed with a magnetic beneficiation machine.

Thereafter, as necessary, the powder (calcined material) after the classification is heated in an oxidizing atmosphere, and thus an oxide film is formed on the particle surface, with the result that the resistance of the ferrite particles may be increased (resistance increasing processing). As the oxidizing atmosphere, either of the atmosphere and the mixed atmosphere of oxygen and nitrogen may be used. The heating temperature preferably falls within a range of 200 to 800° C., and more preferably falls within a range of 250 to 600° C. The heating time preferably falls within a range of 0.5 to 5 hours.

The ferrite particles produced as described above are used as the carrier core material of the present invention. Then, in order for the desired chargeability and the like to be obtained, the outer circumference of the carrier core material is coated with a resin, and is used as an electrophotographic development carrier.

As the resin with which the surface of the carrier core material is coated, a conventional known resin can be used. Examples thereof include polyethylene, polypropylene, polyvinyl chloride, poly-4-methylpentene-1, polyvinylidene chloride, ABS (acrylonitrile-butadiene-styrene) resin, polystyrene, (meth) acrylic-based resins, polyvinyl alcohol-based resins, thermoplastic elastomers such as polyvinyl chloride-based, polyurethane-based, polyester-based, polyamide-based and polybutadiene-based thermoplastic elastomers and fluorine silicone-based resins.

Although a method of coating the carrier core material with the resin is not particularly limited, an impact method of performing coating with physical stress or the like can be used. For example, in the case of the impact method, the amount of resin applied can be adjusted by the amount of resin charged and an agitation time.

With respect to the particle diameter of the carrier, its volume average particle diameter generally falls within a range of 10 to 200 μm, and particularly preferably falls within a range of 10 to 50 μm The electrophotographic developer according to the present invention is formed by mixing the carrier produced as described above and the toner. The mixing ratio between the carrier and the toner is not particularly limited, and is preferably determined, as necessary, from development conditions of a development device used or the like. In general, the concentration of the toner in the developer preferably falls within a range of 1 to 15 mass %. This is because when the concentration of the toner is less than 1 mass %, an image density is excessively lowered whereas when the concentration of the toner exceeds 15 mass %, the toner is scattered within the development device, and thus a stain within an apparatus may be produced or a failure may occur in which the toner is adhered to a background part of transfer paper or the like. The concentration of the toner more preferably falls within a range of 3 to 10 mass %.

As the toner, a toner can be used which is manufactured by a conventional known method such as a polymerization method, a milling/classification method, a melting granulation method or a spray granulation method. Specifically, a toner can be preferably used in which a coloring agent, a mold release agent, a charge control agent and the like are contained in a binder resin whose main component is a thermoplastic resin.

With respect to the particle diameter of the toner, in general, its volume average particle diameter by a coulter counter preferably falls within a range of 5 to 15 μm, and more preferably falls within a range of 7 to 12 μm.

A modifier may be added to the surface of the toner as necessary. Examples of the modifier include silica, alumina, zinc oxide, titanium oxide, magnesium oxide and polymethyl methacrylate. One type thereof can be used or two or more types thereof can be combined and used.

The mixing of the carrier and the toner can be performed with a conventional known mixing device. For example, a Henschel mixer, a V-type mixer, a tumbler mixer and a hybridizer can be used.

EXAMPLE 1

7190 g of $Fe_2O_3$, 2715 g of $Mn_3O_4$ and 117 g of $SrCO_3$ were dispersed in 2506 g of water, and 36 g of hydrochloric acid, 36 g of ammonia water serving as a pH adjuster, 30 g of carbon black serving as a reducing agent and 60 g of an ammonium polycarboxylate-based dispersant serving as a dispersant were added, with the result that a mixture was formed. As hydrochloric acid and ammonia water, a 36 wt % aqueous solution and a 25 wt % aqueous solution were respectively used. The mixture was subjected to milling processing with a wet ball mill (medium diameter of 2 mm), and thus mixed slurry was obtained.

The mixed slurry was sprayed with a spray drier into hot air of about 140° C. (the number of revolutions of a disc was 20,000 rpm), and thus a dried granulated material having a particle diameter of 10 to 200 µm was obtained.

Figure 3:
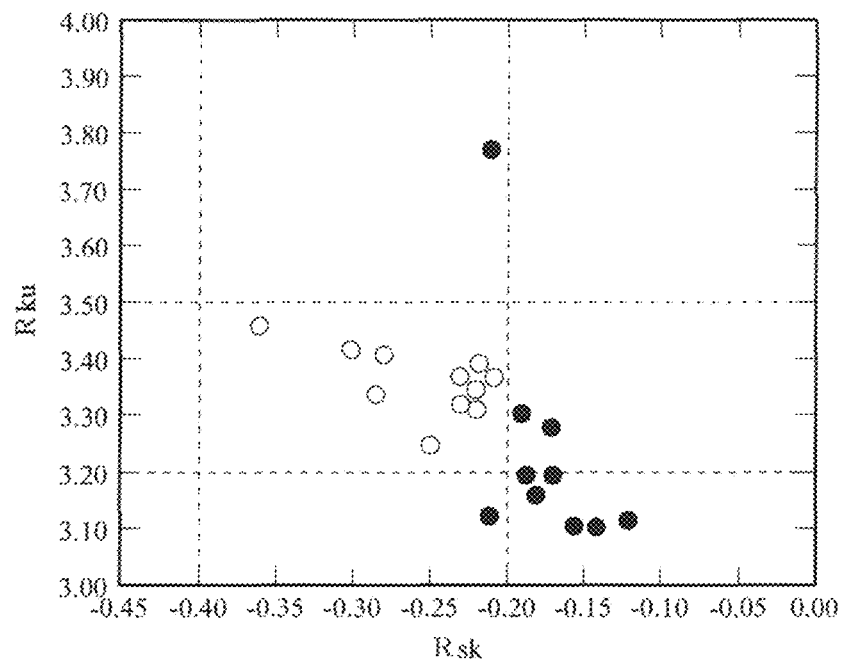
FIG. 3 A graph indicating a relationship between the skewness Rsk and the kurtosis Rku of the carrier core material.

The granulated material was put into an electric furnace and was calcined in an atmosphere of oxygen of 3,000 ppm at 1140° C. for 3 hours. The obtained calcined material was milled with a hammer mill and was then classified with a vibration sieve, and thus a carrier core material having a volume average particle diameter of 35 µm was obtained. The apparent density, the magnetic properties, the skewness Rsk, the kurtosis Rku and the maximum height Rz of the obtained carrier core material were measured by methods described below. For carrier core materials in examples and comparative examples below, measurements were performed by the same methods. FIG. 3 is a graph showing a relationship between the skewness Rsk and the kurtosis Rku of the carrier core materials in the examples and the comparative examples.

(Production of Two-Component Developer)

A carrier was produced by coating the surface of the carrier core material of example 1 with a resin. Specifically, 5 weight parts of a silicone resin was added to 100 weight parts of the carrier core material, and was agitated at 90° C. for 15 minutes, and thus coating was performed, with the result that the carrier was obtained. The obtained carrier and the toner whose average particle diameter was about 5.0 µm were mixed with a pot mill for a predetermined time, and thus a two-component electrophotographic developer was obtained. An adjustment was performed such that toner mass/(toner mass+carrier mass)=5/100. For the carrier core materials in examples 2 to 12 and comparative examples 1 to 10, two-component electrophotographic developers were likewise obtained.

EXAMPLE 2

By the same method as in example 1 except that the calcination temperature in the calcination process was set to 1180° C., the carrier core material was obtained.

EXAMPLE 3

By the same method as in example 1 except that the calcination temperature in the calcination process was set to 1230° C., the carrier core material was obtained.

EXAMPLE 4

By the same method as in example 1 except that the amount of hydrochloric acid mixed was set to 24 g and that the amount of ammonia water was set to 24 g, the carrier core material was obtained.

EXAMPLE 5

By the same method as in example 4 except that the calcination temperature in the calcination process was set to 1180° C., the carrier core material was obtained. FIG. 1 shows an SEM photograph of the obtained carrier core material.

EXAMPLE 6

By the same method as in example 1 except that the amount of hydrochloric acid mixed was set to 72 g and that the amount of ammonia water was set to 72 g, the carrier core material was obtained.

EXAMPLE 7

By the same method as in example 1 except that the amount of $SrCO_3$ mixed was set to 26 g, the carrier core material was obtained.

EXAMPLE 8

By the same method as in example 1 except that the amount of $SrCO_3$ mixed was set to 235 g, the carrier core material was obtained.

EXAMPLE 9

By the same method as in example 2 except that as the starting raw materials, 7190 g of $Fe_2O_3$, 2747 g of $Mn_3O_4$, 126 g of $SrCO_3$, 363 g of MgO, 26 g of hydrochloric acid and 26 g of ammonia water were used, the carrier core material was obtained.

EXAMPLE 10

By the same method as in example 2 except that as the starting raw materials, 7190 g of $Fe_2O_3$, 2404 g of $Mn_3O_4$, 126 g of $SrCO_3$, 544 g of MgO, 26 g of hydrochloric acid and 26 g of ammonia water were used, the carrier core material was obtained.

EXAMPLE 11

By the same method as in example 2 except that as the starting raw materials, 7190 g of $Fe_2O_3$, 1228 g of $Mn_3O_4$, 122 g of $SrCO_3$, 982 g of MgO, 25 g of hydrochloric acid and 25 g of ammonia water were used, the carrier core material was obtained.

EXAMPLE 12

By the same method as in example 2 except that as the starting raw materials, 7190 g of $Fe_2O_3$, 1039 g of $Mn_3O_4$, 123 g of $SrCO_3$, 1133 g of MgO, 25 g of hydrochloric acid and 25 g of ammonia water were used, the carrier core material was obtained.

COMPARATIVE EXAMPLE 1

By the same method as in example 1 except that the amount of hydrochloric acid mixed was set to 12 g and that the amount of ammonia water was set to 12 g, the carrier core material was obtained.

COMPARATIVE EXAMPLE 2

By the same method as in comparative example 1 except that the calcination temperature in the calcination process was set to 1180° C., the carrier core material was obtained.

COMPARATIVE EXAMPLE 3

By the same method as in comparative example 1 except that the calcination temperature in the calcination process was set to 1230° C., the carrier core material was obtained.

COMPARATIVE EXAMPLE 4

Figure 2:
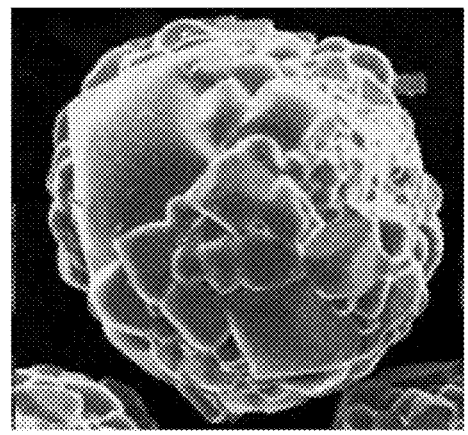
FIG. 2 An SEM photograph of a carrier core material in comparative example 4.

By the same method as in comparative example 3 except that hydrochloric acid and ammonia water were not added, the carrier core material was obtained. FIG. 2 shows an SEM photograph of the obtained carrier core material.

COMPARATIVE EXAMPLE 5

By the same method as in example 1 except that as the starting raw materials, 7190 g of $Fe_2O_3$, 2551 g of $Mn_3O_4$, 22 g of $SrCO_3$ and 207 g of MgO were used, that hydrochloric acid and ammonia water were not added and that the calcination temperature in the calcination process was set to 1225° C., the carrier core material was obtained.

COMPARATIVE EXAMPLE 6

By the same method as in example 2 except that as the starting raw materials, 7190 g of $Fe_2O_3$ and 2715 g of $Mn_3O_4$ were used and that hydrochloric acid and ammonia water were not added, the carrier core material was obtained.

COMPARATIVE EXAMPLE 7

As the starting raw materials, 7190 g of $Fe_2O_3$, 2715 g of $Mn_3O_4$ and 96 g of $SrCO_3$ were dispersed in 2500 g of water, and 36 g of hydrochloric acid, 36 g of ammonia water serving as a pH adjuster, 30 g of carbon black serving as a reducing agent and 60 g of an ammonium polycarboxylate-based dispersant serving as a dispersant were added, with the result that a mixture was formed. The mixture was subjected to milling processing with a wet ball mill (medium diameter of 2 mm), and thus mixed slurry was obtained.

The mixed slurry was sprayed with a spray drier into hot air of about 140° C. (the number of revolutions of a disc was 20,000 rpm), and thus a dried granulated material having a particle diameter of 10 to 200 µm was obtained.

The granulated material was temporarily calcined in the atmosphere at 950° C. for 2 hours. Then, calcination was performed by the same method as in example 2, and thus the carrier core material was obtained.

COMPARATIVE EXAMPLE 8

By the same method as in comparative example 7 except that as the starting raw materials, 7190 g of $Fe_2O_3$, 2747 g of $Mn_3O_4$, 103 g of $SrCO_3$, 363 g of MgO, 38 g of hydrochloric acid and 38 g of ammonia water were used, the carrier core material was obtained.

COMPARATIVE EXAMPLE 9

By the same method as in comparative example 8 except that as the starting raw materials, 7190 g of $Fe_2O_3$ and 2715 g of $Mn_3O_4$ were used, that hydrochloric acid and ammonia water were not added and that temporary calcination was performed at 1250° C. and the main calcination was performed at 1180° C., the carrier core material was obtained.

COMPARATIVE EXAMPLE 10

By the same method as in comparative example 2 except that as the starting raw materials, 7190 g of $Fe_2O_3$, 2715 g of $Mn_3O_4$, 36 g of hydrochloric acid and 36 g of ammonia water were used, the carrier core material was obtained.

(Apparent Density)

The apparent density of the carrier core material was measured according to JIS Z 2504.

(Magnetic Properties)

A room-temperature dedicated vibration sample type magnetometer (VSM) ("VSM-P7" made by Toei Industry Co., Ltd.) was used to apply an external magnetic field in a range of 0 to $79.58 \times 10^4$ A/m (10000 oersteds) continuously in one cycle, and thus magnetization $\sigma_{1k}$ when a magnetic field of $79.58 \times 10^4$ A/m (10000 oersteds) was applied and saturation magnetization $\sigma_s$ were measured.

(Measurements of Skewness Rsk, Kurtosis Rku and Maximum Height Rz)

The skewness Rsk, the kurtosis Rku and the maximum height Rz of the carrier core material were measured as follows. An ultra-deep color 3D shape measuring microscope ("VK-X100" made by Keyence Corporation) was used to observe the surface with a 100× objective lens, and thus the skewness Rsk, the kurtosis Rku and the maximum height Rz were determined. Specifically, the carrier core material was first fixed to an adhesive tape whose surface was flat, a measurement view was determined with the 100× objective lens, thereafter an autofocus function was used to adjust a focal point to the surface of the adhesive tape and an auto-shooting function was used to capture the three-dimensional shape of the surface of the carrier core material.

Figure 4:
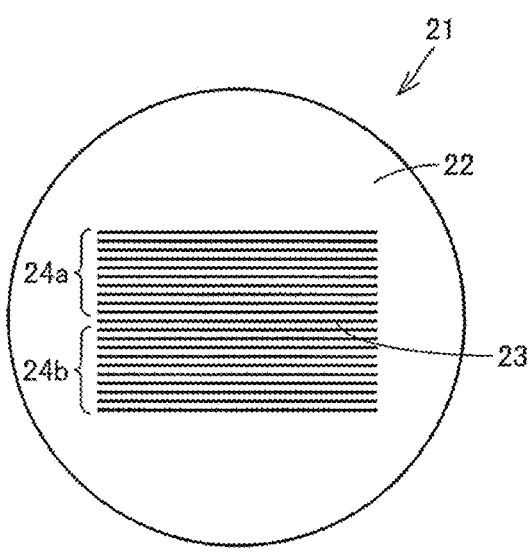
FIG. 4 A schematic view showing the surface of the carrier core material.

The measurements of individual parameters were performed with software VK-H1XA attached to the device. First, as preprocessing, portions which were used for analysis were taken out of the obtained three-dimensional shape of the surface of the carrier core material. FIG. 4 shows a schematic view of the surface of the carrier core material taken out thereof. In a center portion of the surface 22 of the carrier core material 21, a line segment 23 whose length was 15.0 µm and which was extended in a horizontal direction was drawn, to each of the upper and lower portions thereof, 10 parallel lines at intervals of 0.75 µm were added and a total of 21 roughness curves on the line segment were taken. In FIG. 4, the 10 line segments 24a on the upper side and the 10 line segments 24b on the lower side are schematically shown.

Since the carrier core material was formed substantially in the shape of a sphere, the roughness curve taken had a given curvature as a background. Hence, as the correction of the background, the optimal quadratic curve was fitted and was subtracted from the roughness curve. In this case, a cutoff value λs was set to 0.25 µm, and a cutoff value λc was set to 0.08 mm.

The skewness Rsk was calculated by applying the roughness curve to a formula shown in mathematical formula 1 below.

$$Rsk = \frac{1}{Rq^3}\left(\frac{1}{N}\right)\sum_{n=1}^{N} Rn^3 \qquad \text{[Mathematical Formula 1]}$$

Here, Rn in mathematical formula 1 represents a difference from a mean line of the nth peak or trough in the reference length of 15 µm, and a root mean square height Rq is determined by a formula shown in mathematical formula 2 below.

$$Rq = \sqrt{\frac{1}{N}\sum_{n=1}^{N} Rn^2} \quad \text{[Mathematical Formula 2]}$$

Here, the skewness Rsk obtained indicates that as the value thereof is increased, a greater deviation to a region located in the trough is made.

Furthermore, the kurtosis Rku of the carrier core material was also calculated. The kurtosis Rku was calculated by applying the roughness curve to a formula shown in mathematical formula 3 below.

$$Rku = \frac{1}{Rq^4}\left(\frac{1}{N}\right)\sum_{n=1}^{N} Rn^4 \quad \text{[Mathematical Formula 3]}$$

Here, the kurtosis Rku obtained indicates that as the value thereof is increased, greater sharpness is made.

The maximum height Rz was determined as the sum of the height of the highest peak and the depth of the deepest trough in the roughness curve.

The measurements of the skewness Rsk, the kurtosis Rku and the maximum height Rz described above were performed according to JIS B0601 (2001 edition).

The average particle diameter of the carrier core material used for analysis was limited to a range of 32.0 to 34.0 μm. As described above, the average particle diameter of the carrier core material which is the target to be measured is limited to a narrow range, and thus it is possible to reduce an error caused by a residue produced in curvature correction. As the average value of each parameter, the average value in 30 particles was used.

(Final Chlorine Concentration)

The concentration of Cl in the carrier core material was measured by a silver nitrate titration method. Specifically, pure water was added to samples, and the samples were left and were thereafter filtered and washed. As an indicator, a phenolphthalein solution was used, and when the solution was acidic, $NaHCO_3$ was added to turn the solution red. The solution after the elution of Cl was titrated with an $AgNO_3$ solution, and thus the concentration of Cl in the carrier core material was measured.

(Actual Device Evaluation)

The two-component developers produced were put into a development device (the peripheral speed of a development roller Vs: 406 mm/sec, the peripheral speed of a photosensitive drum Vp: 205 mm/sec and a photosensitive drum-to-development roller distance: 0.3 mm), 1000 sheets with a blank image were printed and thereafter carrier scattering was evaluated with the following criteria. The results are shown in table 1.

Carrier scattering
"O": 0 to 2 black spots
"Δ": 3 to 10 black spots
"x": 11 or more black spots (Amount of Resin Used)

5 weight parts of the silicone resin was added to 100 weight parts of the carrier core material, and dry coat was performed with the impact method. After the coat processing, a magnetic selection was performed to remove non-magnetic components, and then the room-temperature dedicated vibration sample type magnetometer (VSM) ("VSM-P7" made by Toei Industry Co., Ltd.) was used to measure magnetization. The amount of resin used was evaluated from a magnetization ratio before and after the coat "$\sigma_{1k}$ (after the coat)/$\sigma_{1k}$ (before the coat)". The criteria were as follows.

"O": "$\sigma_{1k}$ (after the coat)/$\sigma_{1k}$ (before the coat)" was 98 to 100%
"Δ": "$\sigma_{1k}$ (after the coat)/$\sigma_{1k}$ (before the coat)" was 96 to 98%
"x": "$\sigma_{1k}$ (after the coat)/$\sigma_{1k}$ (before the coat)" was 96% or less

TABLE 1

| | | Charging (mol %) | | Calcination process | | Final chlorine concentration |
| | | | | Temporary calcination | Main calcination | |
| | Main composition | Sr | Cl | temperature ° C. | temperature ° C. | (mol %) |
|---|---|---|---|---|---|---|
| Example 1 | $Mn_{0.85}Fe_{2.15}O_4$ | 0.27 | 0.12 | — | 1140 | 0.0020 |
| Example 2 | $Mn_{0.85}Fe_{2.15}O_4$ | 0.27 | 0.12 | — | 1180 | |
| Example 3 | $Mn_{0.85}Fe_{2.15}O_4$ | 0.27 | 0.12 | — | 1230 | |
| Example 4 | $Mn_{0.85}Fe_{2.15}O_4$ | 0.27 | 0.08 | — | 1140 | |
| Example 5 | $Mn_{0.85}Fe_{2.15}O_4$ | 0.27 | 0.08 | — | 1180 | |
| Example 6 | $Mn_{0.85}Fe_{2.15}O_4$ | 0.27 | 0.08 | — | 1140 | 0.0022 |
| Example 7 | $Mn_{0.85}Fe_{2.15}O_4$ | 0.06 | 0.12 | — | 1140 | |
| Example 8 | $Mn_{0.85}Fe_{2.15}O_4$ | 0.54 | 0.12 | — | 1140 | |
| Example 9 | $Mn_{0.8}Mg_{0.2}Fe_2O_4$ | 0.27 | 0.08 | — | 1180 | 0.0016 |
| Example 10 | $Mn_{0.7}Mg_{0.3}Fe_2O_4$ | 0.27 | 0.08 | — | 1180 | |
| Example 11 | $Mn_{0.37}Mg_{0.56}Fe_{2.07}O_4$ | 0.27 | 0.08 | — | 1180 | |
| Example 12 | $Mn_{0.31}Mg_{0.64}Fe_{2.05}O_4$ | 0.27 | 0.08 | — | 1180 | |
| Comparative example 1 | $Mn_{0.85}Fe_{2.15}O_4$ | 0.27 | 0.04 | — | 1140 | |
| Comparative example 2 | $Mn_{0.85}Fe_{2.15}O_4$ | 0.27 | 0.04 | — | 1180 | |
| Comparative example 3 | $Mn_{0.85}Fe_{2.15}O_4$ | 0.27 | 0.04 | — | 1230 | |
| Comparative example 4 | $Mn_{0.85}Fe_{2.15}O_4$ | 0.27 | 0 | — | 1230 | |
| Comparative example 5 | $Mn_{0.75}Mg_{0.12}Fe_{2.1}O_4$ | 0.05 | 0 | — | 1225 | |
| Comparative example 6 | $Mn_{0.85}Fe_{2.15}O_4$ | 0 | 0 | — | 1180 | |
| Comparative example 7 | $Mn_{0.85}Fe_{2.15}O_4$ | 0.22 | 0.12 | 950 | 1180 | |

TABLE 1-continued

| | | | | | | |
|---|---|---|---|---|---|---|
| Comparative example 8 | $Mn_{0.85}Mg_{0.2}Fe_2O_4$ | 0.22 | 0.12 | 950 | 1180 | |
| Comparative example 9 | $Mn_{0.85}Fe_{2.15}O_4$ | 0 | 0 | 1250 | 1150 | |
| Comparative example 10 | $Mn_{0.85}Fe_{2.15}O_4$ | 0 | 0.12 | — | 1180 | |

| | Rsk | Rku | Rz (μm) | AD (g/cm³) | σs (Am²/kg) | σ1k (Am²/kg) | Carrier scattering | Resin amount used |
|---|---|---|---|---|---|---|---|---|
| Example 1 | −0.29 | 3.34 | 3.05 | 1.86 | 82.5 | 68.7 | ○ | ○ |
| Example 2 | −0.28 | 3.41 | 2.78 | 2.05 | 82.9 | 69.9 | ○ | ○ |
| Example 3 | −0.22 | 3.39 | 2.58 | 2.23 | 84.1 | 71.7 | ○ | ○ |
| Example 4 | −0.22 | 3.31 | 2.59 | 1.95 | 82.1 | 69.2 | ○ | ○ |
| Example 5 | −0.21 | 3.37 | 2.48 | 2.07 | 83.2 | 70.8 | ○ | ○ |
| Example 6 | −0.36 | 3.46 | 3.23 | 1.80 | 81.9 | 6.75 | ○ | ○ |
| Example 7 | −0.25 | 3.25 | 2.26 | 2.01 | 82.7 | 69.1 | ○ | ○ |
| Example 8 | −0.30 | 3.42 | 3.21 | 1.97 | 80.1 | 66.1 | ○ | ○ |
| Example 9 | −0.22 | 3.35 | 2.47 | 2.05 | 68.6 | 58.1 | ○ | ○ |
| Example 10 | −0.23 | 3.37 | 2.46 | 2.12 | 65.2 | 56.1 | ○ | ○ |
| Example 11 | −0.22 | 3.31 | 2.48 | 2.11 | 45.7 | 43.1 | ○ | ○ |
| Example 12 | −0.23 | 3.32 | 2.42 | 2.10 | 41.1 | 39.0 | ○ | ○ |
| Comparative example 1 | −0.19 | 3.19 | 2.18 | 2.08 | 82.2 | 69.6 | Δ | x |
| Comparative example 2 | −0.14 | 3.10 | 2.14 | 2.17 | 83.2 | 70.8 | Δ | x |
| Comparative example 3 | −0.16 | 3.10 | 2.10 | 2.23 | 84.5 | 72.4 | Δ | x |
| Comparative example 4 | −0.17 | 3.28 | 1.76 | 2.36 | 84.2 | 71.2 | Δ | Δ |
| Comparative example 5 | −0.21 | 3.12 | 1.67 | 2.23 | 72.3 | 61.9 | Δ | Δ |
| Comparative example 6 | −0.19 | 3.30 | 1.29 | 2.37 | 86.6 | 71.6 | Δ | Δ |
| Comparative example 7 | −0.18 | 3.16 | 1.99 | 2.15 | 83.2 | 70.2 | Δ | x |
| Comparative example 8 | −0.17 | 3.19 | 1.97 | 2.20 | 67.9 | 57.5 | Δ | x |
| Comparative example 9 | −0.21 | 3.77 | 1.90 | 2.21 | 81.3 | 70.1 | x | ○ |
| Comparative example 10 | −0.12 | 3.11 | 1.34 | 2.43 | 8.35 | 71.2 | Δ | x |

In the carrier core materials of examples 1 to 12 in which the concave-convex portions of the particle surfaces fell within the ranges of the skewness Rsk and the kurtosis Rku specified in the present invention, no carrier scattering occurred regardless of the compositions of ferrites, and smaller amounts of resin than the conventional amount were used.

By contrast, in the carrier core material of comparative example 1 in which a small amount of chlorine was mixed, the skewness Rsk was high, the kurtosis Rku was low, carrier scattering occurred to some extent and a large amount of resin was used.

In the carrier core materials of comparative examples 2 and 3 in which the calcination temperatures were set higher than in comparative example 1 so as to be 1180° C. and 1230° C., the skewness Rsk was further increased, the kurtosis Rku was further decreased, carrier scattering occurred to some extent as in the carrier core material of comparative example 1 and a large amount of resin was used. In the carrier core material of comparative example 4 in which chlorine was not mixed, the skewness Rsk was high, carrier scattering occurred to some extent and a smaller amount of resin than the conventional amount was used but satisfactory levels were not achieved.

In the carrier core material of comparative example 5 in which the main composition was a MnMg ferrite and in which hydrochloric acid was not mixed, the kurtosis Rku was low, carrier scattering occurred to some extent and a smaller amount of resin than the conventional amount was used but satisfactory levels were not achieved.

In the carrier core material of comparative example 6 in which a Sr component raw material and hydrochloric acid were not mixed, the kurtosis Rku was high, carrier scattering occurred to some extent and a smaller amount of resin than the conventional amount was used but satisfactory levels were not achieved.

In the carrier core material of comparative example 7 in which temporary calcination was performed to evaporate a chlorine component and in which thereafter the main calcination was performed, the skewness Rsk was high, the kurtosis Rku was low, carrier scattering occurred to some extent and the amount of resin used was equal to or more than the conventional amount.

In the carrier core material of comparative example 8 in which the main composition was the MnMg ferrite and in which temporary calcination was performed before the main calcination, as in comparative example 7, the skewness Rsk was high, the kurtosis Rku was low, carrier scattering occurred to some extent and the amount of resin used was equal to or more than the conventional amount.

In the carrier core material of comparative example 9 in which the Sr component raw material and hydrochloric acid were not mixed and in which temporary calcination was performed before the main calcination, a smaller amount of resin than the conventional amount was used but the kurtosis Rku was high and carrier scattering occurred.

In the carrier core material of comparative example 10 in which the Sr component raw material was not mixed, the skewness Rsk was high, the kurtosis Rku was low, carrier scattering occurred to some extent and a smaller amount of resin than the conventional amount was used but satisfactory levels were not achieved.

INDUSTRIAL APPLICABILITY

In the carrier core material according to the present invention, a concave-convex shape formed in the surface thereof is a specific shape, and thus cracking or chipping is unlikely to occur, with the result that even when an image formation speed is increased, it is possible to maintain high image quality even in long-term use. It is also possible to reduce the amount of coating resin used without properties such as electrical resistance being lowered, and thus the carrier core material is useful.

The invention claimed is:

1. A carrier core material that comprises ferrite particles, wherein a skewness Rsk of a surface of the core carrier material is equal to or more than −0.40 but equal to or less than −0.20,
a kurtosis Rku of a surface of the core carrier material is equal to or more than 3.20 but equal to or less than 3.50, and
the ferrite particles comprise Mn and Mg.
2. The carrier core material according to claim 1,
wherein a maximum height Rz of a surface of the carrier core material is equal to or more than 2.20 μm but equal to or less than 3.50 μm.
3. An electrophotographic development carrier,
wherein a surface of the carrier core material according to claim 1 is coated with a resin.
4. An electrophotographic developer comprising:
the electrophotographic development carrier according to claim 3; and
a toner.

* * * * *